United States Patent [19]

Sekido et al.

[11] Patent Number: 4,483,942

[45] Date of Patent: Nov. 20, 1984

[54] PROCESS OF PREPARING HYDROGENATION CATALYSTS

[75] Inventors: Yasuo Sekido, Yokohama; Akira Inoue, Kawasaki; Masao Mori, Yokosuka; Tatsuki Kubo, Kawasaki, all of Japan

[73] Assignee: Nippon Oil Co., Ltd., Tokyo, Japan

[21] Appl. No.: 540,781

[22] Filed: Oct. 11, 1983

[30] Foreign Application Priority Data

Oct. 15, 1982 [JP] Japan ............................... 57-180864
Dec. 6, 1982 [JP] Japan ............................... 57-213617

[51] Int. Cl.$^3$ .................... B01J 21/04; B01J 21/12; B01J 23/86; B01J 23/88
[52] U.S. Cl. .................................. 502/255; 502/254; 502/256; 502/257; 502/314
[58] Field of Search ............... 502/254, 255, 256, 257, 502/314

[56] References Cited

U.S. PATENT DOCUMENTS

| | | | |
|---|---|---|---|
| 1,914,558 | 6/1933 | Craver | 502/312 |
| 2,753,310 | 7/1956 | Riedl | 502/314 |
| 2,755,257 | 7/1956 | Donovan et al. | 502/314 |
| 4,107,087 | 8/1978 | Pessimisis | 502/254 |

*Primary Examiner*—W. J. Shine
*Attorney, Agent, or Firm*—Bucknam & Archer

[57] ABSTRACT

A process for the production of hydrogenation catalysts is disclosed which is characterized by the use of citric acid or malic acid as a stabilizer in a specified amount with respect to Group VI metal salts which are used in combination with Group VIII metal salts to produce an impregnating solution. The solution is impregnated with alumina or silica-alumina and calcined to form a catalyst.

2 Claims, No Drawings

PROCESS OF PREPARING HYDROGENATION CATALYSTS

BACKGROUND OF THE INVENTION

1. Field of the Invention

This invention relates to a process of preparing hydrogenation catalysts for use in desulfurization, denitrogenation, decomposition and refining of hydrocarbons.

2. Prior Art

Known hydrogenation catalysts comprise in most cases alumina or silica-alumina carriers on which active components such as Group VIII and Group VI metals are supported. A water solution or an aqueous ammonia having dissolved therein salts of one or more of these metals was rather unstable and prone to precipitate in a short period of time or as soon as the metals are deposited on or impregnated into the carrier. There were difficulties with such prior art catalysts in that objectionable color spots have developed on the catalyst and active metals were not uniformly deposited on the carrier.

Attempts have been made to eliminate or alleviate the above difficulties by incorporating citric acid, EDTA and other chelating agents as a stabilizer in the impregnating solution. The amount of such chelating agents required would increase with increasing concentration of Group VI or VIII metals used, which would result in too viscous impregnating solution to make stirring thereof impossible. Large quantities of ammonia gas were also required to maintain pH of 7-11 for stabilization of the complex, but it was not possible to adjust pH above 9 unless considerable water was used to cool because of the heat generated during reaction. Another drawback was that undue length of time was required for impregnation because of the solution being too viscous and hence exhaustive de-watering operation was necessitated to remove viscous metal deposits from the catalyst surfaces. All of these difficulties would cause an increase of the cost of catalysts production.

SUMMARY OF THE INVENTION

Whereas, it is an object of the present invention to overcome the foregoing difficulties of the prior art.

A more specific object of the invention is to provide a process for the production of hydrogenation catalysts in which highly stable impregnating solution is obtainable even with high concentrations of active metals used.

Another specific object of the invention is to provide a process for the production of hydrogenation catalysts wherein less ammonia gas is required to stabilize the complexes, less cooling water to suppress reaction heat and less time for metal impregnation, and de-watering after impregnation is facilitated.

Briefly stated, the process of the present invention comprises preparing a water solution having 5-30 percent by weight of at least one of ammonium salts of Group VI metals (as oxide) and 1-8 percent by weight of at least one of the group consisting of sulfates, carbonates, organic acid salts, chlorides and hydroxides of Group VIII metals (as oxide), adding citric acid or malic acid in a predetermined amount with respect to said Group VI metal oxides, applying ammonia gas to adjust pH of the system to 7-11, impregnating an alumina or silica-alumina carrier and calcining the same.

DETAILED DESCRIPTION

According to a preferred mode of the process of the invention, one of Group VI metal salts is added to water and heated to melt at 50°-95° C., followed by addition of citric acid or malic acid, or alternatively one of Group VI metal salts, water and citric acid or malic acid are added all at a time and heated to melt at that temperature. The resulting solution is supplied with an ammonia gas to make its pH to be about 8.5 and then added slowly with one of Group VIII metal salts. Ammonia gas is again introduced into the solution to adjust pH to 7-11, preferably 8-10. A carrier of alumina or silica-alumina is now impregnated with the solution. The impregnated solution is de-watered, dried at 100°-120° C. and calcined at 500°-600° C. for 2-5 hours.

Citric acid is used to stabilize the above listed metal salts and for this purpose added in an amount of 0.1-0.28 mol, preferably 0.15-0.25 mol per mol of Group VI metal oxide such as $MoO_3$, $CrO_3$ and $WO_3$. Smaller amounts of citric acid would result in incomplete dissolution of the salts and unstable Group VI metal. Larger amounts of citric acid would literally lead to objectionally viscous impregnated solution.

Malic acid which has also been found as a stabilizer eligible for the purpose of the invention may be added in an amount of 0.1-0.3 mol per mol of Group VI metal oxide.

Group VI metal salts as used in the invention are ammonium chromate, ammonium molybdate and ammonium tungstate.

Group VIII metal salts as used in the invention are sulfate, carbonate, organic acid salt, chloride and hydroxide of iron, cobalt or nickel, of which carbonate, organic acid salt and hydroxide are particularly preferred. The organic acid salt here is one having 2-5 carbon atoms such as acetate, formate and tartrate.

Taking carbonate for example, its carbonic acid radical upon being heated turns into carbonic acid gas without leaving objectionable ions in the impregnating solution, so that it can be sufficiently complexed in the presence of a Group VIII metal and ammonia thereby stabilizing the solution. A limited amount of citric acid is required as the stabilizer. When Group VI metal salt to be used is relatively high in concentration, there is added some citric acid but this alone cannot provide a stable solution with pH near 9. As Group VIII metal salt is then added, the resulting solution becomes highly stable for reasons which are believed to be that ammonium complex and citric acid complex of Group VIII metals are bonded in some form with citric acid complex of Group VI metals and oxygen acid ion of Group VIII metals and turn into a stable material of high solubility.

Whereas, if nitrate is used for highly concentrated active metal and $NH_3$ gas is fed to stabilize its complex in the presence of molybdic acid ion, nitric acid ion, ammonium acid ion and nickel ion, there are produced at pH above 8.5 considerable precipitates which contain $NO_3$, $NH_4$, and Ni. This problem becomes serious where the active components are highly concentrated. To prevent the occurrence of such precipitates, large amounts of citric acid would be required so that a stable chelate of Ni and citric acid or the like is formed. This, however, is accompanied by adverse results because the resulting solution becomes too viscous due to the presence of considerable ions of a wide variety.

The impregnating solution according to the invention undergoes precipitation if its pH is lower than 7. Conversely, with pH above 11, the carrier tends to dissolve to some extent and the solution become unstable due to excess ammonium. The pH of the solution should therefore be adjusted to the order of 7–11, preferably 8–10.

Group VI metal salts according to the invention should be added in such an amount that they remain as oxides in an amount of 5–30 wt.%, preferably 10–20 wt.% in the final catalyst composition. Suitable amounts of Group VIII metal salts to be added are such that they remain as oxides in a range of 1–8, preferably 3–7 wt.% in the final catalyst composition.

The carrier to be used in the invention may be nearly amorphous γ-alumina, highly chrystallized γ-alumina, or silica-alumina containing a maximum of 85 wt.% of silica.

The hydrogenation catalysts provided in accordance with the invention find application in desulfurization, denitrogenation, decomposition and refining of hydrocarbons.

The invention will be further described by way of the following examples.

INVENTIVE EXAMPLE 1

To 150 grams of ammonium molybdate was added 330 milliliters water. The admixture was heated to dissolve, followed by addition of 50 grams of citric acid (citric acid/$MoO_3$=0.25 mol). Ammonia gas was fed to adjust pH of the admixture to be about 8.5. The resulting basic solution was slowly added to 60 grams of nickel hydroxide and then adjusted to pH of 9.5–10.0 with ammonia gas. There was obtained 500 milliliters blue, transparent impregnating solution which showed no signs of precipitation after a lapse of 30 days. An alumina carrier was introduced, and the solution was de-watered, dried at 110° C. and subsequently calcined at 550° C. for 3 hours. The resulting catalyst contained 5.1 wt.% of NiO and 14.8 wt.% of $MoO_3$.

INVENTIVE EXAMPLE II

To 150 grams of ammonium molybdate was added 330 milliliters water. The admixture was heated to dissolve, followed by addition of 17.8 grams of citric acid (citric acid/$MoO_3$=0.25 mol). Ammonia gas was fed to adjust pH of the admixture to be about 8.5. The resulting basic solution was slowly added to 60 grams of nickel hydroxide and then adjusted to pH of 9.5–10.0 with ammonia gas. There was obtained 500 milliliters blue, transparent impregnating solution which showed no signs of precipitation after a lapse of 7 days. An alumina carrier was introduced, and the solution was de-watered, dried at 110° C. and subsequently calcined at 550° C. for 3 hours. The resulting catalyst contained 5.1 wt.% of NiO and 14.8 wt.% of $MoO_3$.

COMPARATIVE EXAMPLES I–IV

The procedure of Inventive Example I was followed with the exception that the amount of citric acid was varied. As shown in Table 1 below, the use of citric acid in excess of the amounts specified according to the invention resulted in unstable impregnating solution. With mol ratio of citric acid/$MoO_3$ above 1.2, the solution was stable but so viscous that it took one full day to complete impregnation of the carrier.

TABLE 1

|  | Metal Concentration in Solution | | Amount of Citric acid by mol ratio | | Viscosity of solution (cp) | Stability of solution |
| --- | --- | --- | --- | --- | --- | --- |
|  | NiO*[1] (g/cc) | $MoO_3$ (g/cc) | Citric acid/NiO | Citric acid/$MoO_3$ | | |
| Inventive Example I | 0.08 | 0.24 | 0.39 | 0.25 | 5.7 | Blue, transparent. No precipitates after 1 month. |
| Inventive Example II | 0.08 | 0.24 | 0.16 | 0.1 | 5.1 | Blue, transparent. No precipitates after 1 month. |
| Comparative Example I | 0.08 | 0.24 | 0 | 0 | 5.0 | Blue, transparent. Small amount of precipitates. |
| Comparative Example II | 0.08 | 0.24 | 0.78 | 0.5 | — | Large amounts of precipitates after 1 day. |
| Comparative Example III | 0.08 | 0.24 | 1.55 | 1.0 | — | Large amounts of precipitates after 1 day. |
| Comparative Example IV | 0.08 | 0.24 | 1.87 | 1.2 | 19.3 | Blue, transparent. No precipitates after 1 month. |

*[1]:NiO:Ni(OH)$_2$.H$_2$O

INVENTIVE EXAMPLE III

To 217 grams of ammonium molybdate were added 250 milliliter water and 65 grams of citric acid. The admixture was heated to dissolve. Ammonia gas was fed to adjust pH of the system to be about 8.5. The resulting solution was added to 89 grams of basic nickel carbonate and then adjusted to pH of 9.5–10.0 with ammonium gas. There was obtained 500 milliliters blue, transparent impregnating solution. An alumina carrier was introduced, and the solution was dewatered, dried and subsequently calcined in the manner described in Inventive Example I. The resulting catalyst contained 6.0 wt.% of NiO and 19.5 wt.% of $MoO_3$. It is to be noted that it took only about one hour to complete impregnation and subsequent de-watering was quite easy.

INVENTIVE EXAMPLES IV AND V

The procedure of Inventive Example I was followed except that the amounts of NiO and $MoO_3$ were increased with the mol ratio of citric acid/$MoO_3$ held constant at 0.25 as shown in Table 2. There were obtained impregnating solutions of surprisingly high concentration with NiO=0.14 gram/cc and $MoO_3$=0.48 gram/cc. This process is effective particularly where there is need for highly active catalysts.

TABLE 2

|  | Metal Concentration in Solution | | Amount of Citric acid by mol ratio | | Viscosity of solution (cp) | Stability of solution |
| --- | --- | --- | --- | --- | --- | --- |
|  | NiO*[1] (g/cc) | MoO$_3$ (g/cc) | Citric acid/NiO | Citric acid/MoO$_3$ |  |  |
| Inventive Example III | 0.11 | 0.35 | 0.44 | 0.25 | 9.0 | Blue, transparent. No precipitates after 1 month. |
| Inventive Example IV | 0.08 | 0.24 | 0.39 | 0.25 | 5.7 | Blue, transparent. No precipitates after 1 month. |
| Inventive Example V | 0.14 | 0.48 | 0.47 | 0.25 | 15.1 | Blue, transparent. No precipitates after 1 month. |

*[1]:NiO:NiCO$_3$.2Ni(OH)$_2$.H$_2$O

INVENTIVE EXAMPLES VI-XIII

The procedure of Inventive Example I was followed except that different Group VIII metal salts were used with ammonium molybdate held unchanged as shown in Table 3. The resulting solution was stable in each case.

TABLE 3

|  | Group VIII metal | Stability on pH control | Stability with time |
| --- | --- | --- | --- |
| Inventive Example VI | Cobalt acetate | Excellent | No precipitation after 1 week |
| Inventive Example VII | Cobalt tartrate | " | No precipitation after 1 week |
| Inventive Example VIII | Cobalt carbonate | " | No precipitation after 1 week |
| Inventive Example IX | Cobalt hydroxide | " | No precipitation after 1 week |
| Inventive Example X | Nickel acetate | " | No precipitation after 1 week |
| Inventive Example XI | Nickel tartrate | " | No precipitation after 1 week |
| Inventive Example XII | Nickel carbonate | " | No precipitation after 1 week |
| Inventive Example XIII | Nickel hydroxide | " | No precipitation after 1 week |

Note:
Metal concentration in solution: NiO or CoO:0.08 g./cc and MoO$_3$:0.24 g./cc.
Citric acid/Ni or Co mol ratio: 0.25

COMPARATIVE EXAMPLES V-IX

The procedure of Inventive Example I was followed with the exception that nickel nitrate was used. As shown in Table 4, there was obtained impregnating solutions with citric acid/MoO$_3$ ratios greater than 0.88. However, such solutions showed a very narrow range of pH stability. This range is believed to improve with increasing citric acid.

TABLE 4

|  | Metal concentration in solution | | Citric acid by mol ratio | | |
| --- | --- | --- | --- | --- | --- |
|  | NiO(g/cc)*[1] | MoO$_3$(g/cc) | Citric acid/NiO | Citric acid/MoO$_3$ | |
| Comparative Example V | 0.08 | 0.24 | 0 | 0 | Impossible to make homogeneous solution at pH of 8-10. |
| Comparative Example VI | 0.08 | 0.24 | 0.46 | 0.28 | Impossible to make homogeneous solution at pH of 8-10. |
| Comparative Example VII | 0.08 | 0.24 | 1.00 | 0.65 | Impossible to make homogeneous solution at pH of 8-10. |
| Comparative Example VIII | 0.08 | 0.24 | 1.36 | 0.88 | Possible to make homogeneous solution at pH near 8.5 |
| Comparative Example IX | 0.08 | 0.24 | 1.99 | 1.29 | Possible to make homogeneous solution at pH 8.0-8.5 |

*[1]:NiO:Ni(NO$_3$)$_2$.6H$_2$O

INVENTIVE EXAMPLE XIV

To 150 grams of ammonium molybdate was added 330 milliliters water. The admixture was heated to dissolve, followed by addition of 57 grams of malic acid (malic acid/MoO$_3$=0.5 mol). Ammonia gas was fed to adjust pH of the system to be about 8.5. The resulting basic solution was slowly added with 69 grams of nickel carbonate and then adjusted to pH of 9.5-10.0 with ammonia gas. There was obtained 500 milliliters blue, transparent impregnating solution which showed no signs of precipitation after a lapse of 30 days. An extruded alumina carrier was introduced, and the solution was de-watered, dried at 110° C. and subsequently calcined at 550° C. for 3 hours. The resulting catalyst contained 5.1 wt.% of NiO and 14.8 wt.% of MoO$_3$. It took only one hour to complete impregnation, and subsequent de-watering was quite easy.

INVENTIVE EXAMPLES XV-XIX

The procedure of Inventive Example XIV was followed with the exception that the amount of malic acid was varied as shown in Table 5. It has been found that satisfactory results may be obtained with the use of malic acid in an amount corresponding to a malic acid/MoO$_3$ mol ratio of above 0.1, preferably above 0.3, without encountering undue viscosity rise.

TABLE 5

| | Metal concentration in solution | | Malic acid by mol ratio | | Viscosity of solution (cp) | Stability of solution |
|---|---|---|---|---|---|---|
| | NiO (g/cc) | $MoO_3$ (g/cc) | Malic acid /NiO | Malic acid /$MoO_3$ | | |
| Inventive Example XV | 0.08 | 0.24 | 0.2 | 0.1 | — | Blue, transparent. Only appreciable precipitates. |
| Inventive Example XVI | 0.08 | 0.24 | 0.52 | 0.3 | — | Blue, transparent. No precipitation after 1 week |
| Inventive Example XVII | 0.08 | 0.24 | 0.87 | 0.5 | 7.0 | Blue, transparent. No precipitation after 1 week |
| Inventive Example XVIII | 0.08 | 0.24 | 1.58 | 0.9 | — | Blue, transparent. No precipitation after 1 week |
| Inventive Example XIV | 0.08 | 0.24 | 2.10 | 1.2 | 6.9 | Blue, transparent. No precipitation after 1 week |

COMPARATIVE EXAMPLES X-XV

The procedure of Inventive Example XIV was followed except that citric acid was used in place of malic acid in amounts exceeding the specified range as shown in Table 6. Citric acid/$MoO_3$ mol ratios ranging between 0.5-1.0 resulted in considerable precipitates, and with this ratio as high as 1.2, the solution had a viscosity of 19.3 cp, giving rise to impregnation time.

INVENTIVE EXAMPLE XX

The procedure of Inventive Example XIV was followed except that 217 grams of ammonium molybdate, 250 milliliters of water, 8.2 grams of malic acid (malic acid/$MoO_3$=0.5 mol) and 89 grams of basic nickel carbonate were used. The resulting catalyst contained 6.0 wt.% NiO and 19.5 wt.% $MoO_3$.

TABLE 6

| | Metal concentration in solution | | Citric acid by mol ratio | | Viscosity of solution (cp) | Stability of solution |
|---|---|---|---|---|---|---|
| | NiO (g/cc) | $MoO_3$ (g/cc) | Citric acid /NiO | Citric acid /$MoO_3$ | | |
| Comparative Example X | 0.08 | 0.24 | 0 | 0 | 5.0 | Blue, transparent. Only appreciable precipitates |
| Comparative Example XI | 0.08 | 0.24 | 0.16 | 0.1 | 5.1 | Blue, transparent. No precipitation after 1 week |
| Comparative Example XII | 0.08 | 0.24 | 0.39 | 0.25 | 5.7 | Blue, transparent. No precipitation after 1 month |
| Comparative Example XIII | 0.08 | 0.24 | 0.78 | 0.5 | — | Considerable precipitates after 1 day |
| Comparative Example XIV | 0.08 | 0.24 | 1.55 | 1.0 | — | Considerable precipitates after 1 day |
| Comparative Example XV | 0.08 | 0.24 | 1.87 | 1.2 | 1.93 | Blue, transparent. No precipitation after 1 week |

INVENTIVE EXAMPLES XXI-XXVII

The procedure of Inventive Example XIV was followed with the exception that different metals were used in different amounts, as shown in Table 7.

TABLE 7

| | Metal Concentration in solution (g/cc) | | | | | Malic acid/metal oxide mol rate | | Stability of solution |
|---|---|---|---|---|---|---|---|---|
| | $MoO_3$ | $WO_3$ | NiO | CoO | $Fe_2O_3$ | Group VI | Group VIII | |
| Inventive Example XXI | 0.35 | — | — | 0.11 | — | 0.50 | 0.87 | Red violet, transparent. No precipitation after 1 week |
| Inventive Example XXII | 0.35 | — | — | — | 0.11 | 0.50 | 1.77 | Dark red, transparent. No precipitation after 1 week |
| Inventive Example XXIII | 0.35 | — | 0.11 | — | — | 0.50 | 1.11 | Blue, transparent. No precipitation after 1 week |
| Inventive Example XXIV | 0.47 | — | — | 0.11 | — | 0.50 | 1.11 | Red violet, transparent. No precipitation after 1 week |

TABLE 7-continued

| | Metal Concentration in solution (g/cc) | | | | | Malic acid/ metal oxide mol rate | | |
|---|---|---|---|---|---|---|---|---|
| | MoO₃ | WO₃ | NiO | CoO | Fe₂O₃ | Group VI | Group VIII | Stability of solution |
| Inventive Example XXV | — | 0.25 | 0.08 | — | — | 2.0 | 1.00 | Blue, transparent. No precipitation after 1 week |
| Inventive Example XXVI | — | 0.25 | — | 0.08 | — | 2.0 | 1.00 | Red violet, transparent. No precipitation after 1 week |
| Inventive Example XXVII | — | 0.25 | — | — | 0.08 | 2.0 | 2.16 | Dark red, transparent. No precipitation after 1 week |

INVENTIVE EXAMPLES XXVIII–XXXIV

The procedure of Inventive Example XIV was followed except that different Group VIII metal salts were used but with ammonium molybdate unchanged, as shown in Table 8.

TABLE 8

| | Group VIII metal | Stability on pH control | Stability with time |
|---|---|---|---|
| Inventive Example XXVIII | Cobalt acetate | Excellent | No precipitation after 1 week |
| Inventive Example XXIX | Cobalt tartrate | " | No precipitation after 1 week |
| Inventive Example XXX | Cobalt carbonate | " | No precipitation after 1 week |
| Inventive Example XXXI | Cobalt hydroxide | " | No precipitation after 1 week |
| Inventive Example XXXII | Nickel acetate | " | no precipitation after 1 week |
| Inventive Example XXXIII | Nickel tartrate | " | No precipitation after 1 week |
| Inventive Example XXXIV | Nickel nitrate | " | No precipitation after 1 week |

Note:
Metal concentrations in solution:
NiO or CoO: 0.08 g/cc
MoO: 0.24 g/cc
Malic acid/NiO or CoO mol ratio: 0.5

What is claimed is:

1. A process for the production of hydrogenation catalysts which comprises preparing a solution having 5–30 percent by weight as the oxide of at least one of a chromate, a molybdate or a tungstate salt and 1–8 percent by weight as oxide of at least one of Group VIII metal salts, adding a stabilizer, which is citric acid in the amount of 0.1–0.28 mole per mole of $MoO_3$, $CrO_3$ or $WO_3$ or malic acid in the amount of 0.1–0.3 mole per mole of $MoO_3$, $CrO_3$ or $WO_3$, adding ammonia gas to adjust the solution to a pH of 7–11, impregnating an alumina or silica-alumina carrier with said solution, drying and then calcining the impregnated solution at 500°–600° C.

2. The process according to claim 1 wherein the Group VIII metal salt is a carbonate, a chloride, a sulfate or an organic acid salt.

* * * * *